M. FEILD.
CAMERA ATTACHMENT.
APPLICATION FILED JUNE 6, 1916.
1,249,941.
Patented Dec. 11, 1917.
2 SHEETS—SHEET 2.
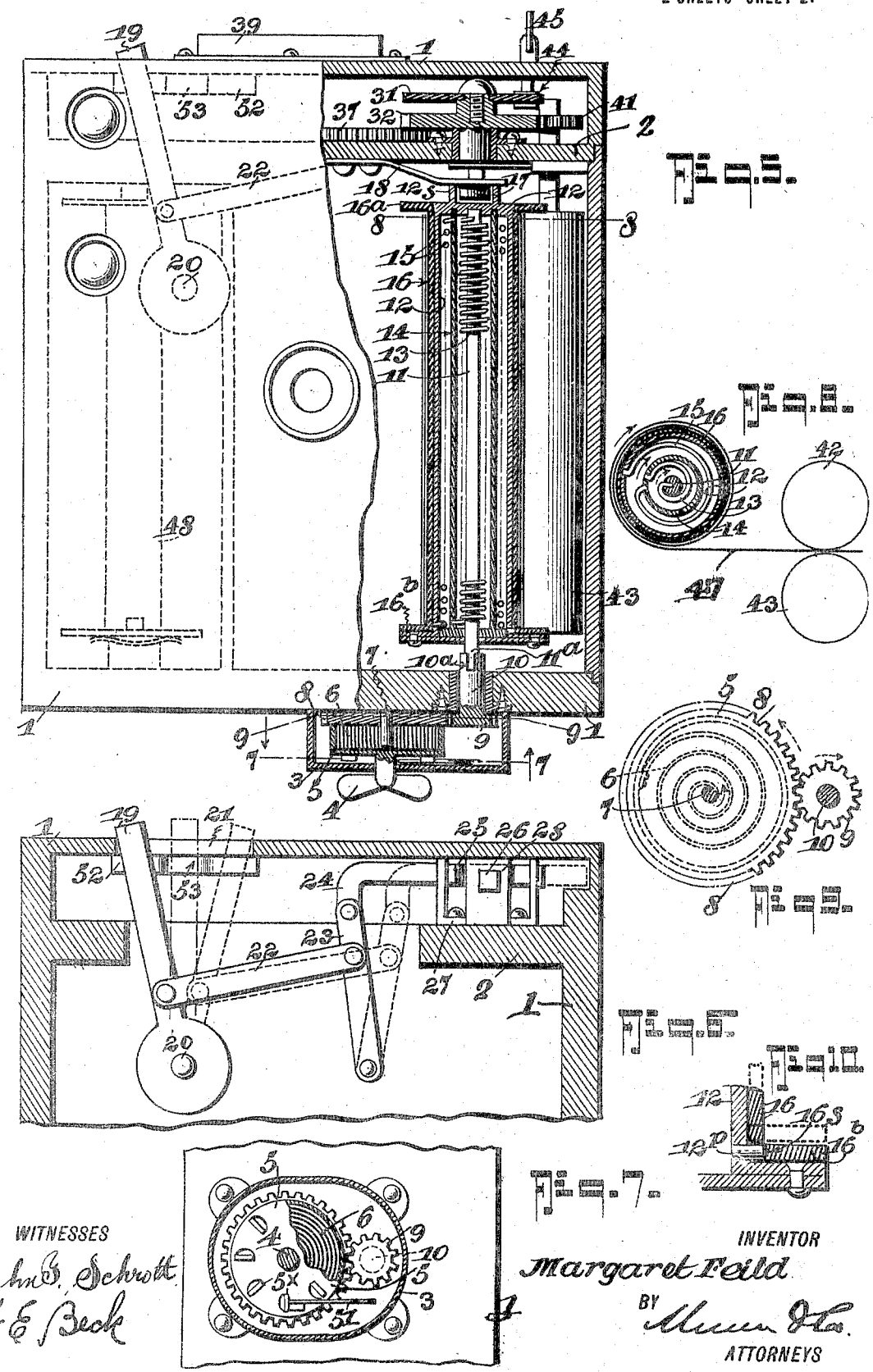
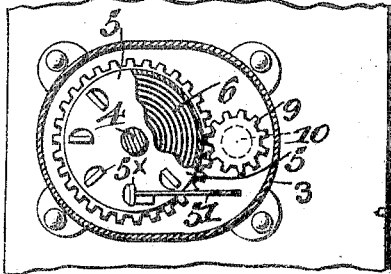
WITNESSES
John S. Schrott
H. E. Beck
INVENTOR
Margaret Feild
BY
ATTORNEYS

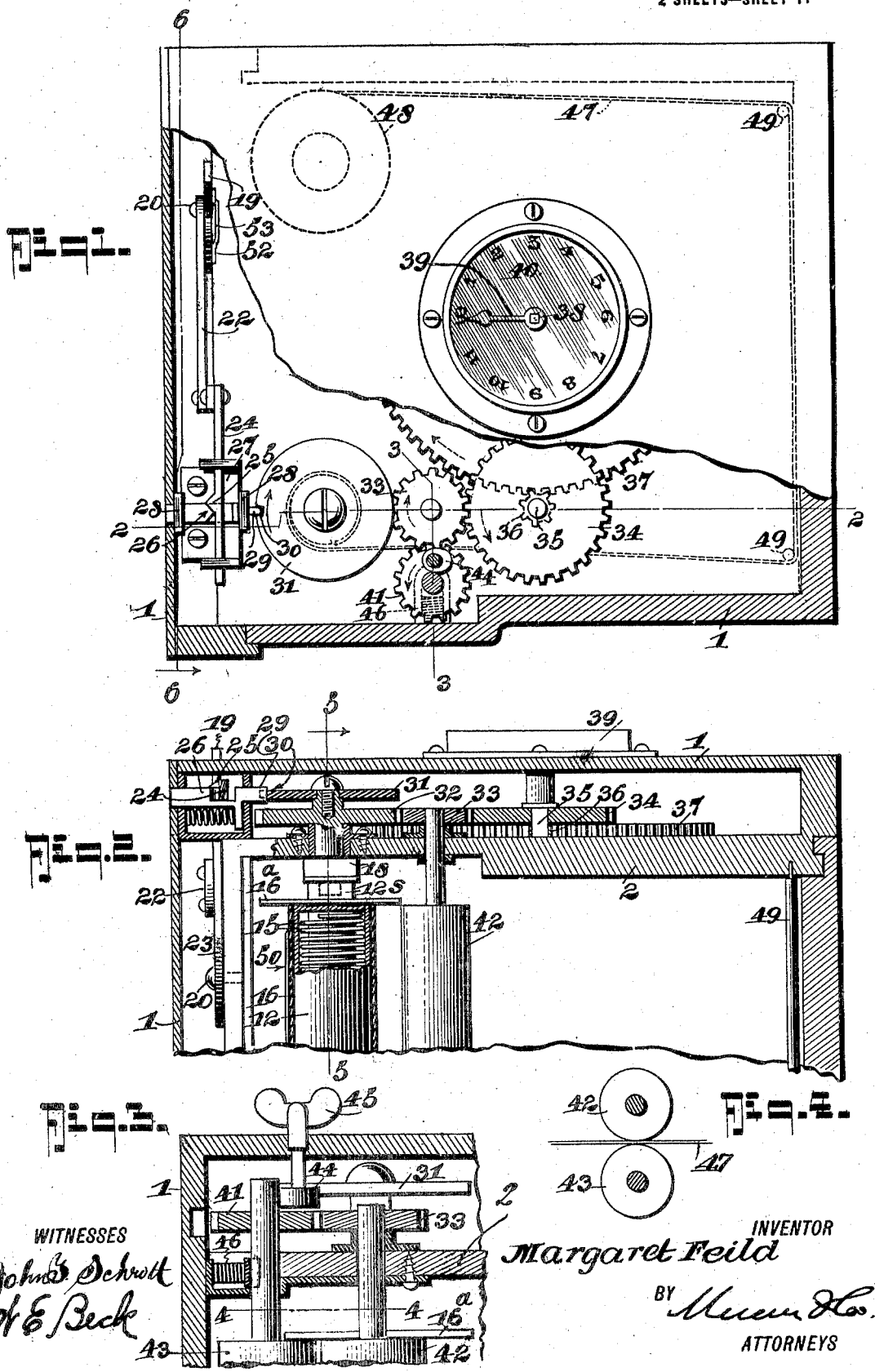

UNITED STATES PATENT OFFICE.

MARGARET FEILD, OF MEMPHIS, TENNESSEE.

CAMERA ATTACHMENT.

1,249,941.
Specification of Letters Patent.
Patented Dec. 11, 1917.

Application filed June 6, 1916. Serial No. 101,944.

*To all whom it may concern:*

Be it known that I, MARGARET FEILD, a citizen of the United States, and a resident of Memphis, in the county of Shelby and State of Tennessee, have made certain new and useful Improvements in Camera Attachments, of which the following is a specification.

My invention relates to improvements in camera attachments, more especially to those designed to automatically shift the film in a hand camera when the shutter operating lever is moved, as in the act of taking a picture.

A further object of my invention is to provide a device of the type described which is simple in construction and operation and which therefore is not liable to easily get out of order.

Other objects and advantages will appear in the following specification and the novel features of the invention will be particularly pointed out in the appended claims.

My invention is illustrated in the accompanying drawings forming part of this application in which—

Figure 1 is a plan view of a portion of the device, certain parts being shown in section.

Fig. 2 is a section along the line 2—2 of Fig. 1.

Fig. 3 is a section along the line 3—3 of Fig. 1.

Fig. 4 is a section along the line 4—4 of Fig. 3.

Fig. 5 is a section along the line 5—5 of Fig. 2.

Fig. 6 is a section along the line 6—6 of Fig. 1.

Fig. 7 is a section along the line 7—7 of Fig. 5.

Fig. 8 is a section along the line 8—8 of Fig. 5.

Fig. 9 is a section along the line 9—9 of Fig. 5, and

Fig. 10 is a sectional detail view of a portion of the winding spool.

Referring now to the drawings, 1 indicates the main body of the camera. It will be observed that at 2 there is a false top which provides a space between said false top and the top of the camera 1 in which certain of the working parts of the mechanism are housed. Referring particularly to Fig. 5, it will be seen that on the bottom of the casing is a housing 3. A winding stem 4 passes through this housing and bears a spring casing 5 or barrel containing a coiled spring 6 one end of which is secured to a shaft 7 upon which is mounted a gear 8. This gear meshes with the pinion 9 on a stub shaft 10 which passes through the casing 1 and which is provided with a cross slot $10^a$.

Disposed on the inside of the camera is a film spool or reel. This comprises a central shaft 11 having a portion $11^a$ aranged to enter the slot $10^a$. The shaft 11 extends into one end of a cylinder or tube 12 and is loosely journaled at its end. It is surrounded by a helical spring 13 which extends substantially the length of the shaft and which is secured at its opposite end to a surrounding tube or cylinder 14, the latter being journaled in the head of the tube 12 so as to revolve freely with respect to the tube 12. Disposed between the tubes 14 and 12 is a helical spring 15 one end of which is secured to the tube 14, the other end being secured to the tube 12. Arranged to slip over one end of the tube 12 (in Fig. 5 the upper end) is a sleeve 16 having flanges $16^a$ and $16^b$. The tube 12 has a socket $12^s$ which is arranged to receive a cylindrical lug 17 carried by a spring 18 so as to permit the revolution of the tube 12 and the sleeve 16 carried thereby.

Referring now particularly to Figs. 5 and 6, I have shown therein a lever 19 which is pivotally mounted at 20 and which projects through an opening or slot 21 in the casing 1 of the camera. This lever is the lever which ordinarily operates the shutter in taking a picture by a hand camera and the shutter operation is caused by merely shifting the lever, as for instance, from the full line position shown in Fig. 6 to the dotted line position on the opposite side. Connected to the lever 19 by means of a link 22 is an arm 23, which is in turn connected with a slidable member 24 having a V-shaped cam member 25, see Fig. 1. The latter is arranged to engage a V-shaped engaging member 26 which is slidably mounted on a plate 27 in guides 28, one end of this slidable member constituting a locking device as shown at 29 in Fig. 1. The construction is such that if the lever 19 is moved to the middle point of its throw into the position shown in dotted lines, the points of the V-shaped cam members 25 and 26 will be in alinement, or in other words the movement of the member 25 will have pushed the member 26 and hence the locking member 29 rearwardly. Normally the locking member 29 rests in a recess 30 in a wheel 31. The latter is connected with a gear 32, see Fig. 2, which in turn meshes with the gear 33, this gear in turn meshing with the gear 34 on a shaft 35. The latter bears a pinion 36 which engages a gear 37 mounted on a shaft 38, which extends through to the top of the camera and bears an arm 39 which moves over a dial 40. As will be seen from Fig. 1, the gear 33 is in mesh with the gear 41. The gear 33 is on the end of a roller 42 while the gear 41 is on the end of roller 43 which is shiftable toward and away from the roller 42 by means of a cam 44, operated by a thumb-piece 45. The movement of the roller is opposed by a spring 46. When, however, the spring 46 is allowed to act without opposition it holds the rollers 43 and 42 closely together.

Consider now Fig. 1. The film 47 is carried by the spool 48 and is drawn over the rollers 49, at the rear of the camera in the usual manner and then is passed forwardly, the thumb-piece 45 being turned so as to push the shafts of the rollers 43 and 42 apart, thereby permitting the threading of the film between the rollers 42 and 43. The film is passed around the sleeve 16 being secured to it in any suitable manner as by passing it under a thin strip of metal 50. The spool may be turned so as to draw the film tight and to wind enough of it on the spool to permit it to draw the remainder without slipping.

The key 4 is now turned so as to partially wind up the spring 6 and this through the medium of the gears 8 and 9 and the stub shaft 10, will cause a movement of the shaft 11 tending to wind up the springs 13 and 15. Now the sleeve 16 has at one end a slot $16^a$ arranged to fit over a pin $12^b$ see Fig. 10, in the cylinder 12 when the slot $16^a$ and the pin are in registration. This will occur either when the paper is being wound on the sleeve by hand or it will occur when the inner cylinder 12 is moving with respect to the sleeve if the latter has not been pushed clear on to the cylinder 12. It may here be stated, that the sleeve 16 is removable from the cylinder 12, the latter being removable from its pivotal bearing 17 in precisely the same manner as a film roll in the ordinary hand camera. When the sleeve 16 has been pushed downwardly and the movement of the cylinder 12 brings the pin $12^p$ into registration with the slot $16^a$ then the sleeve will be positively turned by the movement of the cylinder 12 so as to draw the film with it. Enough of the film is wound on the sleeve 16 to bring the film into position to take the first picture and this is ascertained by viewing the indications on the film backing through the ruby window.

At this point the thumb-piece 45 is manipulated so as to bring the rollers 43 and 42 together. These rollers will clamp the film tightly so that with the apparatus in the position shown in Fig. 1, the key 4 may be wound so as to cause a tightening of the springs 6, 13 and 15 without moving the film.

It will be observed from Fig. 7 that the spring barrel 5 is provided with a series of lugs $5^x$ punched therefrom, which engage a spring 51 which is pushed aside when the spring is being wound up and which resists the reverse movement of the spring.

Now when the spring is wound up the camera is ready for operation. The lever 19 is brought to the center and is held there for a moment. This will move the cam members 25 and 26, see Fig. 1, so as to cause a withdrawal of the tongue 29 from the slot 30 in the disk 31. There is nothing now to oppose the spring tension within the wheel or spool and the latter will, therefore, proceed to turn and will draw the film between the rollers 42 and 43. This will actuate the disk 31 through the medium of the gears 33 and 32 and will also cause the turning of the counter through the medium of the train of gears 34, 36 and 37 thus moving the pointer 39. When now, the slot 30 in the disk 31 reaches the tongue 29 the latter will enter the slot and thereby prevent further movement of the film. This movement of the film of course, occurs very rapidly. Now on moving the lever still farther the shutter will be operated in the ordinary manner and the picture will be taken on the film. In order to facilitate the movement of the lever 19 to its proper position I provide a spring member 52, see Fig. 6, having a slight recess 53 into which the lever 19 will drop when the point of release of the operating mechanism is reached, but from which it may be moved very rapidly.

In making another exposure the lever is moved back toward the center, the film is automatically moved forward, and then by further movement of the lever 19 the shutter is opened for exposure.

In making a time exposure the arm which controls the shutter is drawn out in the usual manner, the lever 19 is pushed to the center of its swing so as to permit the film to change, then pushed to the limit of its swing to open the shutter, then the arm which controls the shutter is pushed inwardly, causing the shutter to close, thus leaving the device in position to move the film for the next picture.

I claim:—

1. In a camera having a film roll, a spring actuated spool arranged to receive one end of the film, a pair of rollers arranged to clamp the film, means for spacing the rollers to permit the passage of the film therebetween, means including a disk provided with a slot, and a spring actuated tongue arranged to enter the slot for preventing the movement of the rollers, and means for moving said spring actuated tongue to release the disk, said means comprising a cam carried by said tongue, and a slidable member having a cam arranged to coöperate with said first-mentioned cam.

2. In a camera having a film roll, a spring actuated spool arranged to receive one end of the film, a pair of rollers arranged to clamp the film, means for spacing the rollers to permit the passage of the film therebetween, means including a disk provided with a slot, and a spring actuated tongue arranged to enter the slot for preventing the movement of the rollers, and means for moving said spring actuated tongue to release the disk, said means comprising a slidable carrier for said tongue having a wedge-shaped cam, a slidable rod having a wedge-shaped cam arranged to engage the first-mentioned wedge-shaped cam to move the latter.

MARGARET FEILD.